(12) United States Patent
Barr et al.

(10) Patent No.: US 7,389,319 B2
(45) Date of Patent: Jun. 17, 2008

(54) ADAPTIVE CONNECTION ROUTING OVER MULTIPLE COMMUNICATION CHANNELS

(75) Inventors: Terrence Barr, Cupertino, CA (US); Peter Strarup Jensen, Fremont, CA (US); Darryl J. Mocek, San Jose, CA (US); Behfar Razavi, San Jose, CA (US); William F. McWalter, Stirling (GB)

(73) Assignee: Sun Microsystems, Inc., Santa Clara, CA (US)

( * ) Notice: Subject to any disclaimer, the term of this patent is extended or adjusted under 35 U.S.C. 154(b) by 745 days.

(21) Appl. No.: 10/104,267

(22) Filed: Mar. 22, 2002

(65) Prior Publication Data
US 2003/0182419 A1 Sep. 25, 2003

(51) Int. Cl.
*G06F 15/16* (2006.01)
(52) U.S. Cl. .................. 709/203; 709/203; 709/227; 455/452.1; 455/452.2
(58) Field of Classification Search ........... 455/452.1, 455/452.2; 709/227, 203
See application file for complete search history.

(56) References Cited

U.S. PATENT DOCUMENTS

| | | | |
|---|---|---|---|
| 6,061,563 A * | 5/2000 | Lee .................. | 455/435.1 |
| 6,119,005 A * | 9/2000 | Smolik .............. | 455/436 |
| 6,332,077 B1 * | 12/2001 | Wu et al. ............ | 455/432.1 |
| 6,385,167 B1 * | 5/2002 | Kamo ................ | 370/228 |
| 6,519,461 B1 * | 2/2003 | Andersson et al. .... | 455/453 |
| 6,580,916 B1 * | 6/2003 | Weisshaar et al. .... | 455/456.1 |
| 6,615,186 B1 * | 9/2003 | Kolls ................ | 705/26 |
| 6,760,303 B1 * | 7/2004 | Brouwer ............. | 370/229 |
| 6,801,510 B2 * | 10/2004 | DiFazio et al. ...... | 370/328 |
| 6,810,510 B2 * | 10/2004 | Bakarian et al. ..... | 370/328 |
| 6,871,067 B2 * | 3/2005 | Clark et al. ........ | 455/428 |
| 6,910,078 B1 * | 6/2005 | Raman et al. ........ | 709/231 |
| 6,934,254 B2 * | 8/2005 | Brown et al. ........ | 370/232 |
| 6,970,703 B2 * | 11/2005 | Fuchs et al. ........ | 455/426.1 |
| 7,084,859 B1 * | 8/2006 | Pryor ............... | 345/173 |
| 2002/0054578 A1 * | 5/2002 | Zhang et al. ........ | 370/328 |
| 2002/0093913 A1 * | 7/2002 | Brown et al. ........ | 370/232 |
| 2002/0128049 A1 * | 9/2002 | Davis ............... | 455/572 |

OTHER PUBLICATIONS

U.S. Appl. No. 10/105,121, filed Mar. 22, 2002, entitled "Arbitration of Communication Channel Bandwidth", Ref. No. SUNMP086.

(Continued)

*Primary Examiner*—Nathan J. Flynn
*Assistant Examiner*—Mohamed Wasel
(74) *Attorney, Agent, or Firm*—Martine Penilla & Gencarella, LLP (57) ABSTRACT

A telematics system is provided. The system includes a telematics client framework having an interface to client applications and being integrated with a client communications framework. The client communications framework has a client stream manager, a client data pump, a client policy manager, and a client channel monitor. The channel monitor detects availability of channels for communication with a telematics server framework. The telematics server framework includes an interface to server applications and is integrated with a server communications framework. The client channel monitor is configured to communicate availability of channels to connection objects of the client data pump. Switching between channels is triggered based on information obtained from the client policy manager.

19 Claims, 8 Drawing Sheets

OTHER PUBLICATIONS

U.S. Appl. No. 10/104,351, filed Mar. 22, 2002, entitled "System and Method for Distributed Preference Data Services", Ref. No. SUNMP087.

U.S. Appl. No. 10/104,297, filed Mar. 22, 2002, entitled "Asynchronous Protocol Framework", Ref. No. SUNMP88.

U.S. Appl. No. 10/104,298, filed Mar. 22, 2002, entitled "Business-Model Agnostic Service Deployment Management Service", Ref. No. SUNMP089.

U.S. Appl. No. 10/104,295, filed Mar. 22, 2002, entitled "Manager Level Device/Service Arbitrator", Ref. No. SUNMP090.

U.S. Appl. No. 10/104,246, filed Mar. 22, 2002, entitled "JAVA Telematics System Preferences", Ref. No. SUNMP092.

U.S. Appl. No. 10/104,243, filed Mar. 22, 2002, entitled "System and Method for Testing Telematics Software", Ref. No. SUNMP093.

U.S. Appl. No. 10/104,860, filed Mar. 22, 2002, entitled "System and Method for Simulating an Input to a Telematics System", Ref. No. SUNMP094.

U.S. Appl. No. 10/104,294, filed Mar. 22, 2002, entitled "JAVA Telemetrics Emulator", Ref. No. SUNMP095.

U.S. Appl. No. 10/104,245, filed Mar. 22, 2002, entitled "Abstract User Interface Manager With Prioritization", Ref. No. SUNMP096.

* cited by examiner

ADAPTIVE CONNECTION ROUTING OVER MULTIPLE COMMUNICATION CHANNELS

CROSS REFERENCE TO RELATED APPLICATIONS

This application is related to (1) U.S. patent application Ser. No. 10/105,121, filed Mar. 22, 2002, and entitled "Arbitration of Communication Channel Bandwidth," (2) U.S. patent application Ser. No. 10/104,351, filed Mar. 22, 2002, and entitled "System and Method for Distributed Preference Data Services," (3) U.S. patent application Ser. No. 10/104,297, filed Mar. 22, 2002, and entitled "Asynchronous Protocol Framework," (4) U.S. patent application Ser. No. 10/104,298, filed Mar. 22, 2002, and entitled "Business-Model Agnostic Service Deployment Management Service," (5) U.S. patent application Ser. No. 10/104,295, filed Mar. 22, 2002, and entitled "Manager Level Device/Service Arbitrator," (6) U.S. patent application Ser. No. 10/104,246, filed Mar. 22, 2002, and entitled "Java Telematics System Preferences," (7) U.S. patent application Ser. No. 10/104,243, filed Mar. 22, 2002, and entitled "System and Method for Testing Telematics Software," (8) U.S. patent application Ser. No. 10/104,860, filed Mar. 22, 2002, and entitled "System and Method for Simulating an Input to a Telematics System," (9) U.S. patent application Ser. No. 10/104,294, filed Mar. 22, 2002, and entitled "Java Telematics Emulator," and (10) U.S. patent application Ser. No. 10/104,245, filed Mar. 22, 2002, and entitled "Abstract User Interface Manager with Prioritization," which are incorporated herein be reference.

BACKGROUND OF THE INVENTION

1. Field of the Invention

This invention relates generally to software for facilitating communication between client software and server software, in an environment where the client is communicating with the server over one or more wireless communication channels.

2. Description of the Related Art

The electronic content and sophistication of automotive designs has grown markedly. Microprocessors are prevalent in a growing array of automotive entertainment, safety, and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, security systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment, and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open, and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same model from year to year. Thus, the heterogeneous nature of the various systems essentially eliminates any benefits of economies of scale since equipment and software must be tailored to each model permutation.

Traditionally, vehicles use wireless connections to communicate with a base station or service provider. As the content available to telematics consumers increases in richness and complexity, a need for better bandwidth management has begun to surface. However, as most telematics-type systems are proprietary in nature, it is difficult to predict how particular devices will handle different communication bandwidth needs, or what types of applications can be written and still be supported.

In view of the forgoing, there is a need for methods to dynamically manage and assign access to communication channels used in wireless communication between a client application and a server application.

SUMMARY OF THE INVENTION

In another embodiment, a system for routing between communication channels used to communicate between a client application and a server application is disclosed. The system includes a communications framework. The communications framework has a data pump for managing connections between the client application and the server application. The data pump implements dedicated connection objects for handling each connection between the client application and the server application. A policy manager for setting desired quality of service properties for connections between the client application and the server application is provided, as well as a channel monitor for monitoring availability of each channel capable of interfacing with the communications framework. Wherein, a connection object desiring to trigger a switch from a current channel to another channel uses information obtained from the channel monitor and the policy manager. In completing the switch, an interface is made with a synchronization control to avoid data loss between the client application and the server application.

In another embodiment, a telematics system is provided. The system includes a telematics client framework having an interface to client applications and being integrated with a client communications framework. The client communications framework has a client stream manager, a client data pump, a client policy manager, and a client channel monitor. The channel monitor detects availability of channels for communication with a telematics server framework. The telematics server framework includes an interface to server applications and is integrated with a server communications framework. The client channel monitor is configured to communicate availability of channels to connection objects of the client data pump. Switching between channels is triggered based on information obtained from the client policy manager.

In yet another embodiment, a method for adaptively routing between multiple communication channels at a client side of telematics system is provided. The method includes: (a) receiving a request for a communications connection from a client application to a server side; (b) establishing a connection object to define a wireless connection between the client side and the server side using one channel selected from two or more available channels; (c) monitoring the two or more available channels; (d) detecting a change in availability of the two or more available channels; (e) referring to a policy to determine if a change in the selected connection is required, and if a change is required; (f) synchronizing data transferred between the client side and the server side to enable switching to another of the two or more available channels.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

An invention is disclosed for adaptive connection routing over multiple communication channels. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

A connection is a logical entity to exchange data between two endpoints on behalf of a user application. A connection requires a communication channel to actually transmit and receive data. More than one communication channel may be available or feasible at a given time, depending on factors such as coverage. In the case of wireless connection, cell modems may only be available in more densely populated areas, and higher throughput connections may only be available at designated areas, such as, services stations. In the case where the wireless device is integrated into an automobile, the automobile may have relatively good reception around town using a cell modem. However, when the vehicle approaches a service station, for example, the service station may provide higher bandwidth coverage. That is, if a subscription was in place by the vehicle owner to obtain higher bandwidth upon entry into designated transmission areas, the system in accordance with the invention would be able to automatically disconnect from the cell modem and reconnect to a higher bandwidth connection, such as an 802.11b wireless LAN standard connection.

Each channel has certain properties associated with it such as bandwidth, reliability, and cost, which influence the decision (policy) on how to use a particular channel over time. In one embodiment, a method is provided to enable intelligent connection routing over a dynamically changing set of communication channels so that a given policy is best fulfilled. For example, one policy might state to always route a connection over the communication channel with the greatest bandwidth while another policy might favor the lowest cost per amount of data transmitted.

However, the channel that is most favorable under a given policy might not be available at all times. In this case, the connection must be routed over a different, less-favorable communication channel until the more-favorable channel becomes available again. Accordingly, optimization in communication connectivity is achieved by balancing channel properties vs. a pluggable policy.

In a preferred embodiment, the method of the present invention is independent of the protocols used and will be applicable to all types of networking stacks. The method further enables re-routing of a connection to happen transparently to the user application, e.g., no intervention by it is required and the data transmitted is unaffected. Although the policy may include input from the user application, this input does not mean the actual rerouting of the connection is less transparent to the application.

An embodiment of the invention enables the change in connection routing dynamically (e.g., at runtime), and the change takes place based on the set policy for a given connection. Accordingly, the method does not mandate a specific policy but allows the policy to be defined independently according to the needs of the specific setup and can then be plugged into the method at deployment time.

Figure 1:
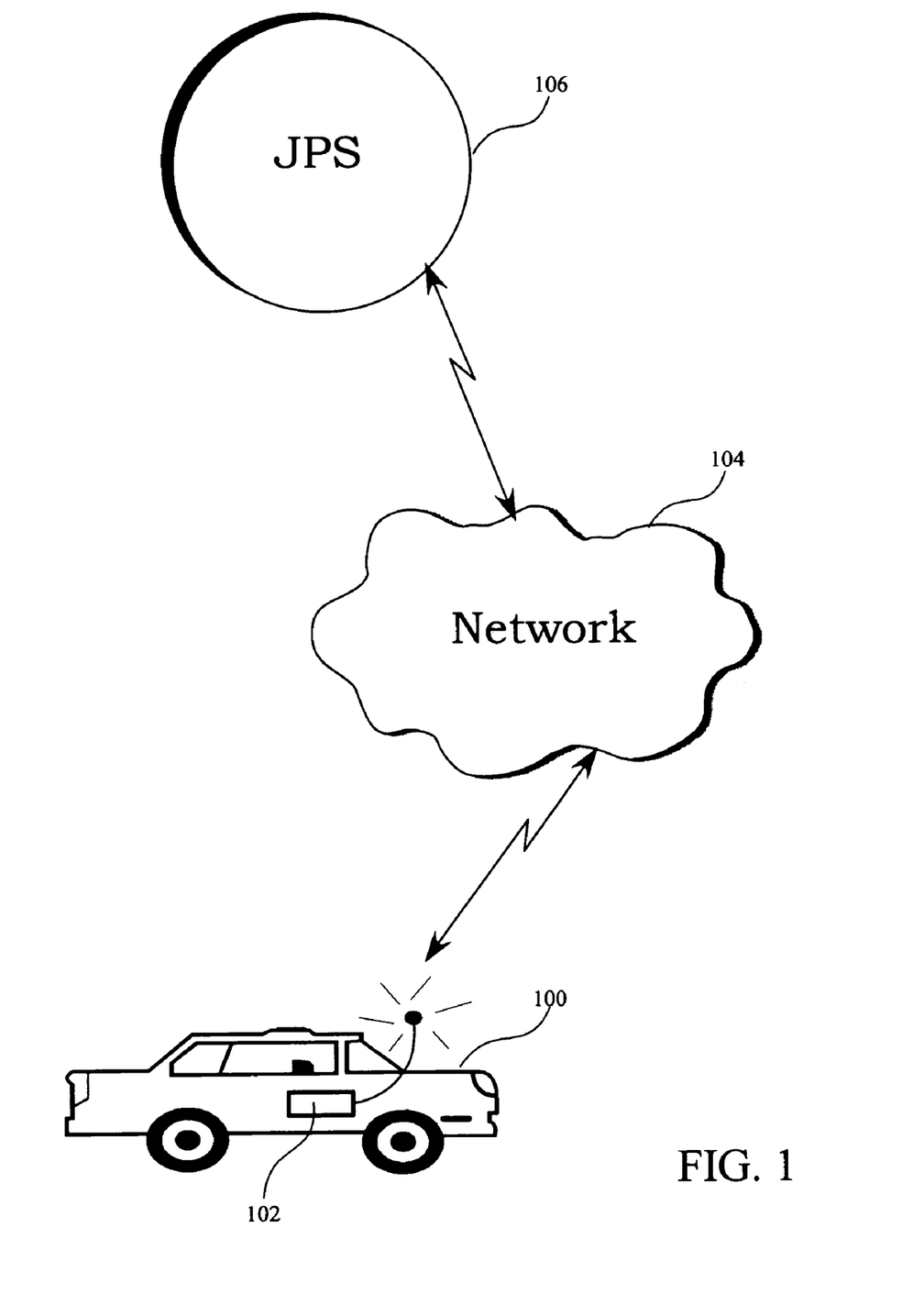
FIG. 1 is a high level schematic overview of an automotive telematics system in accordance with one embodiment of the invention.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106, reference may be made to U.S. patent application Ser. No.

10/104,297, entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

In one embodiment, the client side includes telematics control unit (TCU) 102 contained within a land based vehicle 100. Of course, the TCU's implementation is not limited to land based vehicles, and is equally applicable to boats, planes, hovercraft, space shuttles, etc., which are all recipients of the technology defined herein. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
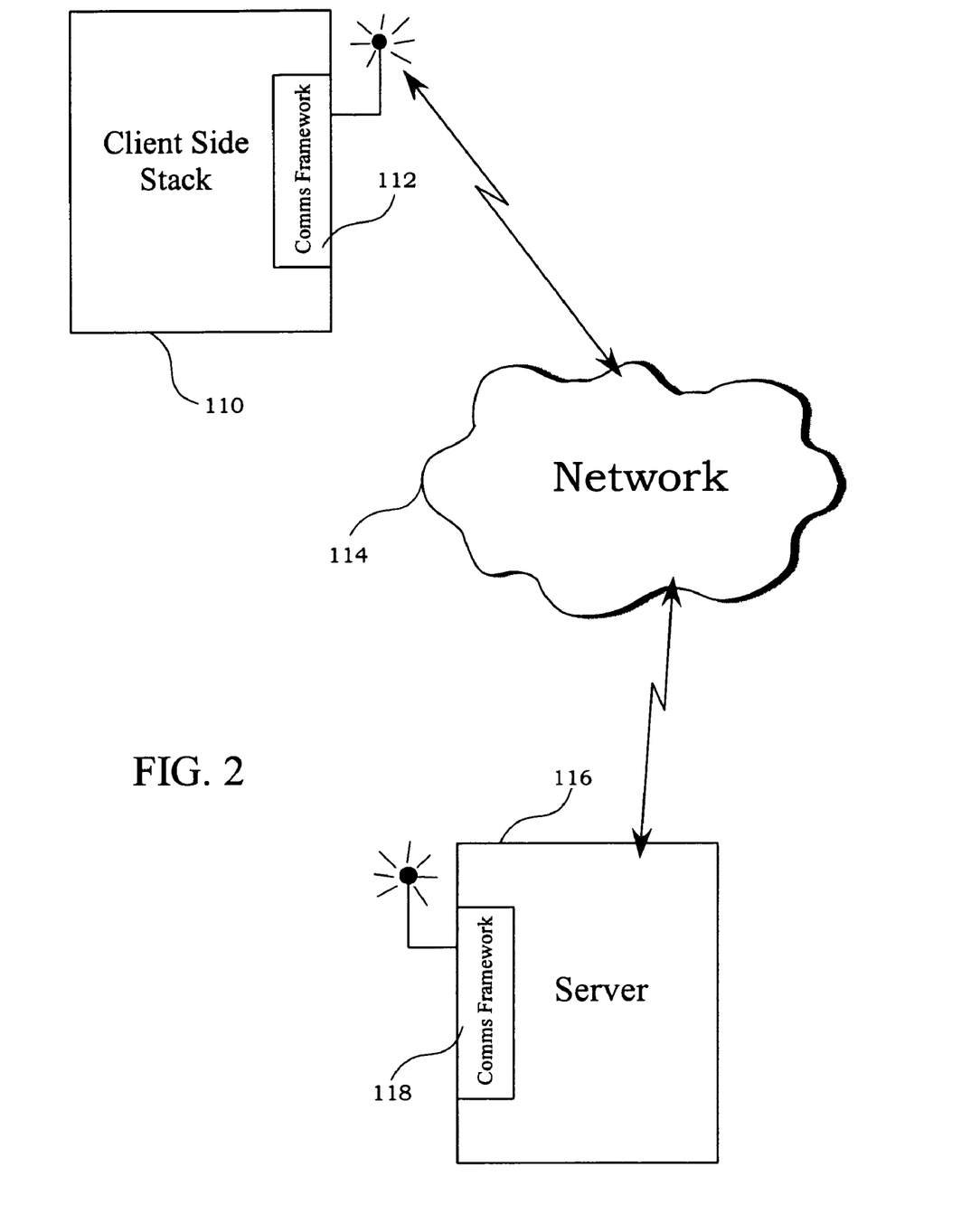
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114.

It should be appreciated that server 116 is not limited to a wireless connection. For example, server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
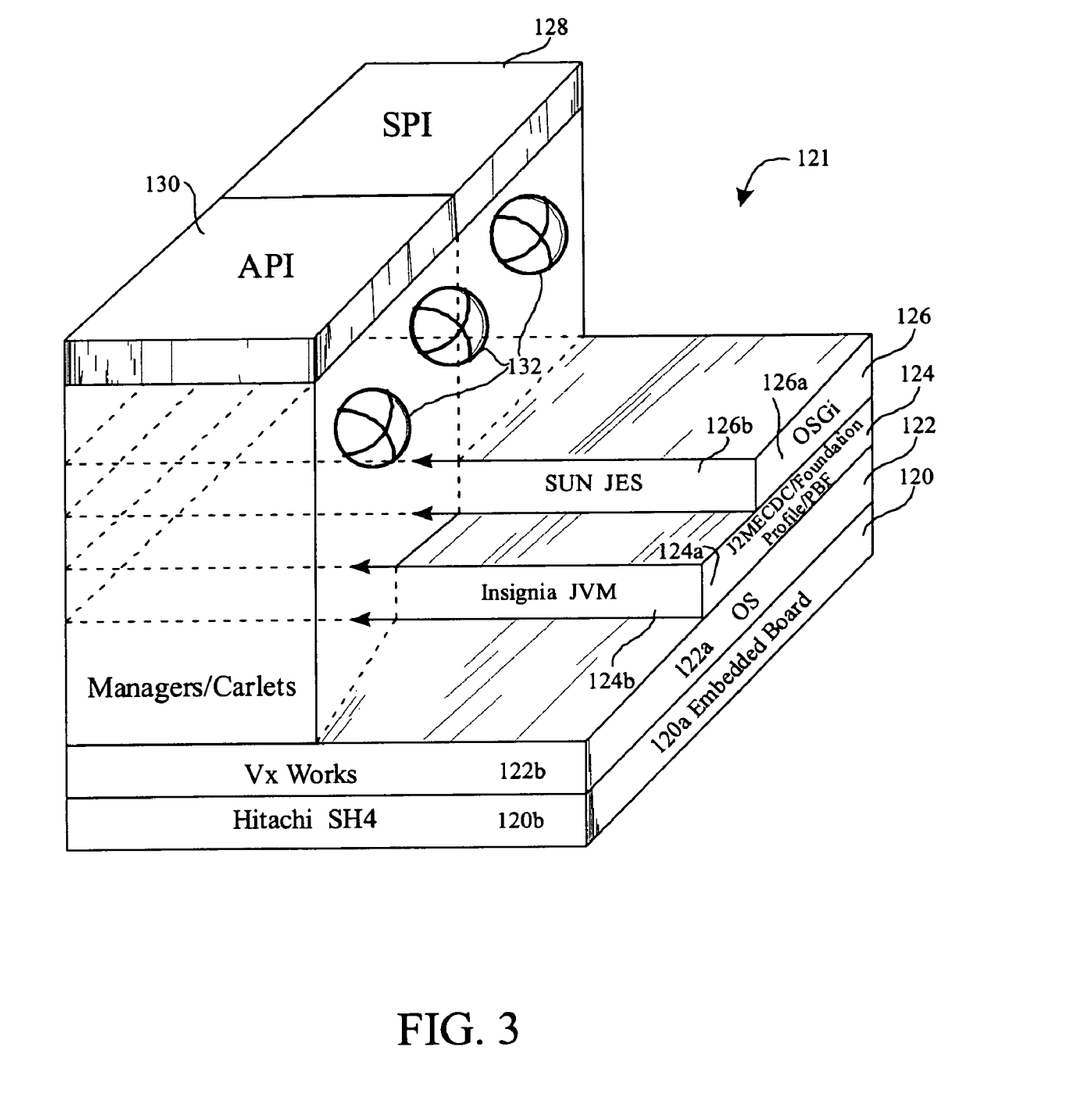
FIG. 3 is a three dimensional pictorial representation of a telematics client implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a land based vehicle. In one embodiment, the TCU is in communication with the electronic components of a vehicle through a vehicle bus or other means. These components include the measurement of vehicle operating and safety parameters, such as tire pressure, speed, oil pressure, engine temperature, etc., as well as information and entertainment components, such as audio system settings, internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC), Foundation Profile, Personal Profile, or Personal Basis Profile. One skilled in the art will appreciate that J2ME Foundation Profile is a set of APIs meant for applications running on small devices that have some type of network connection, while J2ME Personal Profile provides the J2ME environment for those devices with a need for a high degree of Internet connectivity and web fidelity.

The exemplary standards for each of the layers of the stack are provided on the right side of client side reference implementation 121. In particular, OSGI 126a, J2ME 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4, It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGi defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As defined further below, a carlet is a Java™ application. For each function or task to be processed on the client side or between the client and server sides, a carlet is invoked to manage the operation.

Figure 4:
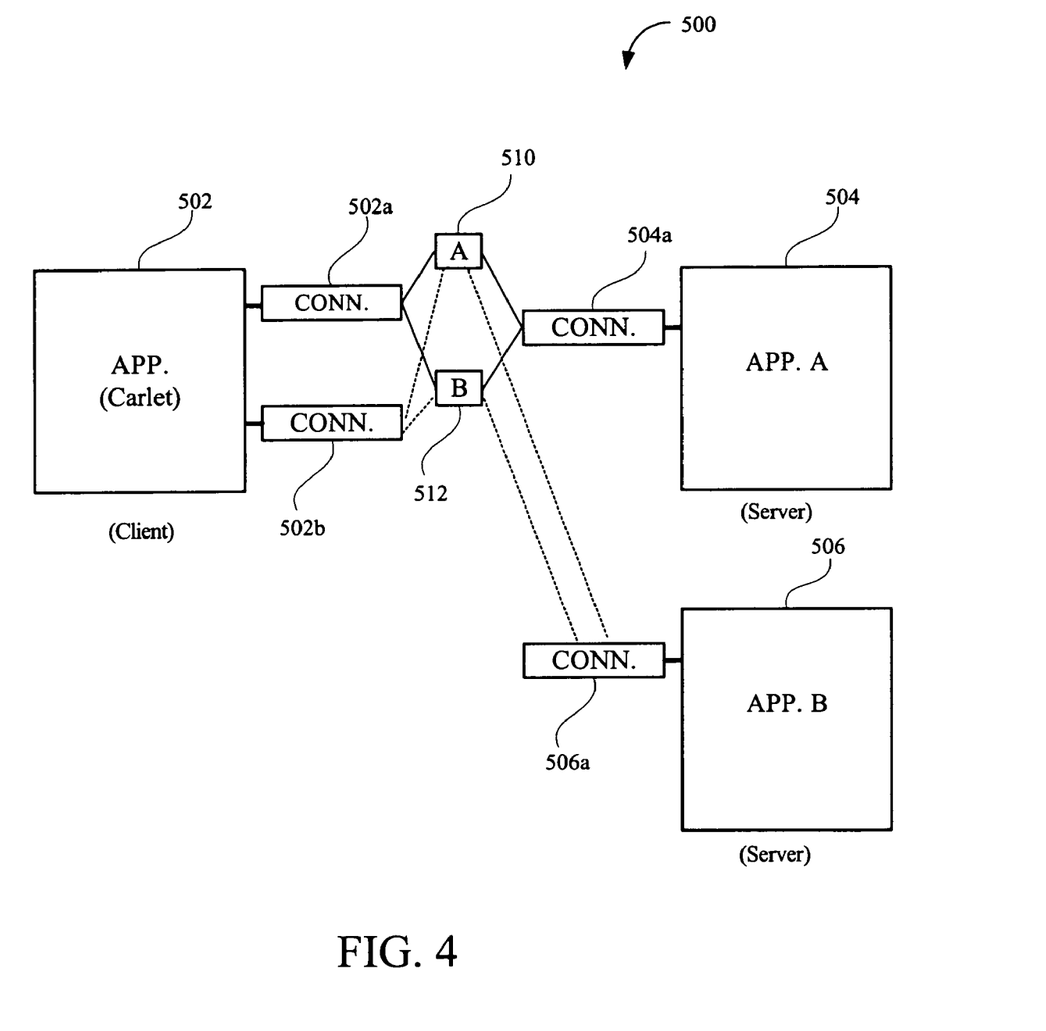
FIG. 4 illustrates exemplary logical connections between a client application and server applications over different channels.

FIG. 4 shows a block diagram of a communication system 500 in which a client side application 502 communicates with applications 504 and 506 of a server side. As discussed above, application 502 may be a carlet application, and application A (APP.A) and application B (APP.B) may be applications running on a server side of a system, such as the telematics system described above. Connections can be established between application 502 and application A 504 over a logical connection established between connection (CONN.) 502a and connection (CONN.) 504a. The logical connection between connection 502a and connection 504a is shown established over a physical channel A 510.

The same logical connection can be established between application 502 and application A 504 over a physical channel B 512. Physical channel A 510, in a wireless environment, may be a cell modem connection. Physical channel B 512 may be, for example, a connection utilizing standard 802.11b. As is well known, the IEEE 802.11b specification defines the protocol for wireless transmission of approximately 11 Mbps of raw data at distances from several dozen to several hundred feet over the 2.4 GHz unlicensed band. Generally speaking, 802.11b is an extension of Ethernet to wireless communication, and is primarily used for TCP/IP, but can also handle other forms of networking traffic. Thus, a wireless connection over standard 802.11b is substantially faster than a connection over a cell modem (e.g., providing a greater bandwidth). Another channel may provide Bluetooth communication. Bluetooth is the name given to a technology standard using short-range radio links, intended to replace the cable(s) connecting portable and/or fixed electronic devices. This technology offers wireless access to LANs, PSTN, the mobile phone network and the internet for a host of home appliances, portable handheld devices, and vehicle telematics devices. Of course, the type of wireless connection is not important, as is the ability to seamlessly and adaptively switch between available channels, while making it transparent to the user application.

Referring to FIG. 4, a connection can also be established between logical connections 502b and 504a to application A 504 over any one of physical channels A 510, physical channel B 512, physical channel N, etc. The same logic applies when a connection is established between application 502 on the client side with application B 506 on the server side. In one embodiment, application 502 will be capable of selecting the most appropriate channel to achieve the quality of service desired for communication between the client and the server. This is true even though channels A 510 and channel B 512 may utilize different network level communication protocols, thus achieving true network protocol independence.

To achieve the foregoing, a communication framework API is provided to enable communication between the client application (carlet) 502 and an application on the server side over a logical connection by selecting the most appropriate, or most efficient communication channel as dictated by a policy. In the communications framework, logic is provided to enable selection between available channels to satisfy a policy set by the user application to achieve the communication quality of service (QoS) desired for a particular application. For instance, if the carlet application 502 were an MP3 media player, and downloading of MP3 music files is an object of the carlet application 502, then the policy may dictate that communication may only occur over a given type of channel, such as an 802.11b channel. If the desired channel were not available, then no connection would be initiated. In another embodiment, upon detecting the availability of the 802.11 channel, the connection would be established for the carlet.

Figure 5:
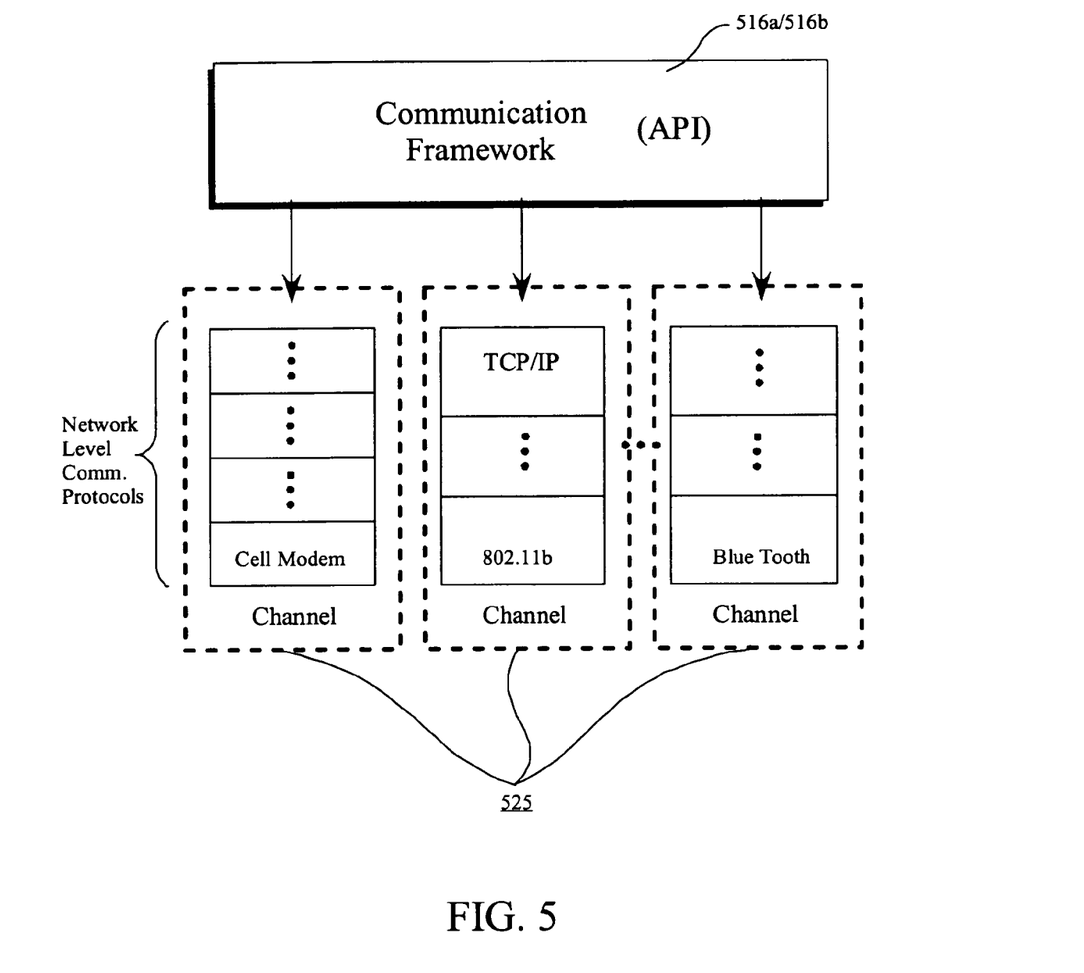
FIG. 5 is a block diagram showing the communication framework API capable of interfacing with disparate communication channels, in accordance with one embodiment of the present invention.

FIG. 5 illustrates a more detailed diagram of the communication's framework (API) 516a/516b. The communication's framework is designed to enable selection between different channels 525 having different network level communication protocols. Accordingly, the communication framework 516 is designed to enable intelligent selection of a given channel to achieve the quality of service desired by the user application (or as defined in the policy). FIG. 5 is simply provided to illustrate how the communications framework (API) 516a/516b is truly independent of the underlying networking protocol. As such, a connection over any one channel will be transparent to the carlet on the client side and the application on the server side. Although TCP/IP is illustrated as an example, it should be understood that the preferred embodiments of the present invention may use any protocol implementation.

Figure 6:
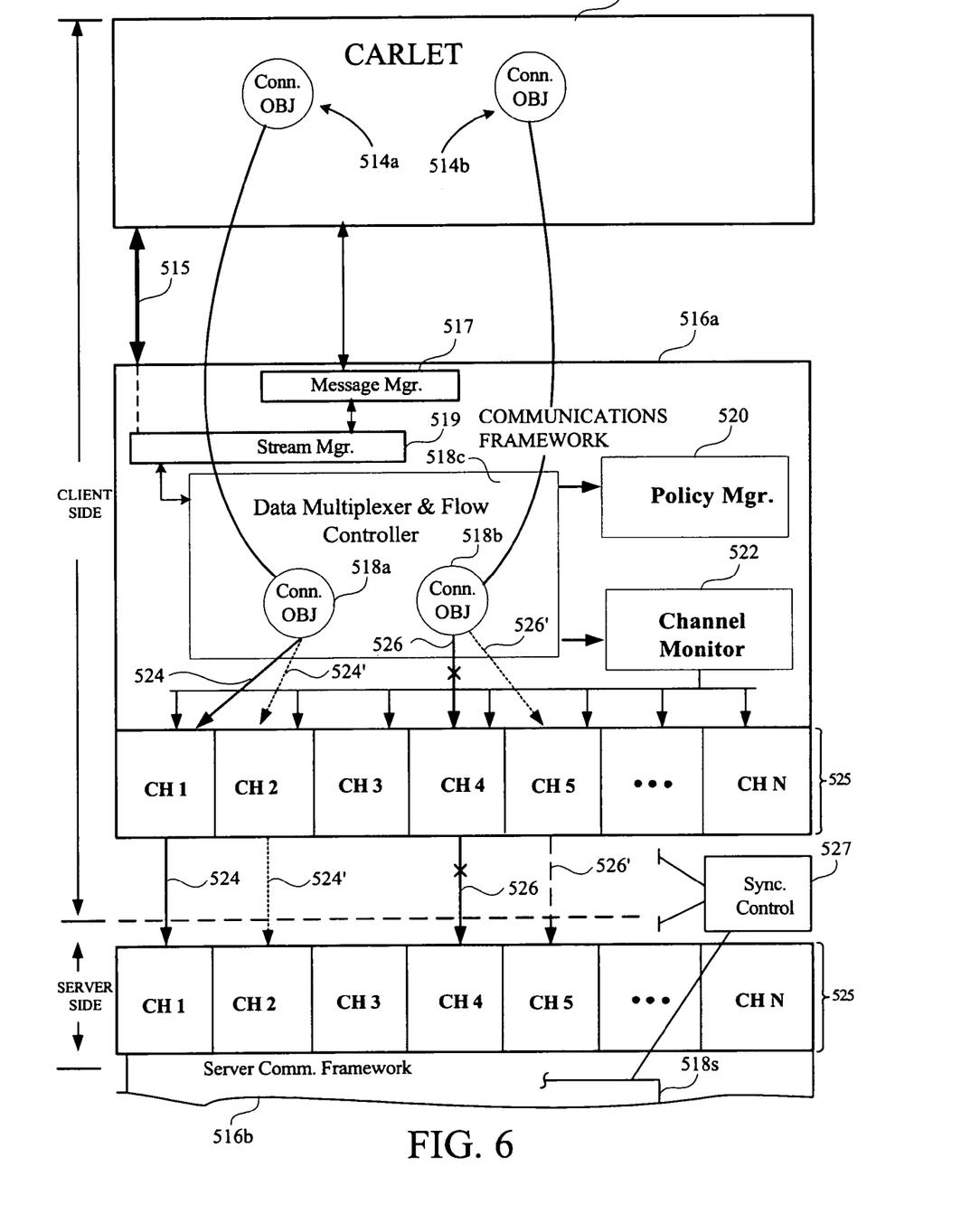
FIG. 6 illustrates an exemplary connection between one carlet (client application) and a server using the communications framework of the present invention.

FIG. 6 illustrates communication between a carlet application 502 and the communications framework 516a on the client side. For purposes of simplicity, the detailed components of the communications framework 516a is only shown from the perspective of the client side, although it should be understood that the server side has a similar communication framework 516b to establish and enable synchronous communication between the client side (e.g., a telematics control unit on a vehicle) and the server side (e.g., a Java telematics server). The telematics java provisioning server is charged with communicating with any number of clients. Such clients may be from any number of vehicles, makes, models, etc, while the client side is specific to a particular vehicle and TCU implementation.

The communications framework 516a will include a message manager 517, a stream manager 519, a data multiplexer and flow controller 518c (i.e., to function as a data pump), a policy manager 520, a channel monitor 522, and an interface to the various physical channels available to the communications framework of the client side. A synchronization control 527 is provided to interface between the client side and the server side. Specifically, the synchronization control 527 will enable communication between the data multiplexer and flow controller 518c of the client side, and the data multiplexer and flow controller 518s of the server side.

In operation, when a particular carlet application 502 is requested, the carlet will communicate 515 with the stream manager 519 and request that a connection be established. In the request, the carlet, in one embodiment, will provide properties detailing what type of connection is needed to satisfy the carlet's bandwidth requirements. As noted above, if the carlet is an MP3 carlet, the properties may designate a particular minimum transfer rate. In response, the stream manager 519 will request a connection object (Conn. OBJ) 518a from the data multiplexer and flow controller 518c. If a channel satisfying the desired bandwidth is available, the data multiplexer and flow controller 518c will return a connection object (Conn. OBJ) 514a back to the carlet. The message manager 517 provides message-based communication, where messages are discrete entities of data (as opposed to a continuous stream of data in a stream connection). In general, messages can be sent and received in both directions, in a synchronous and/or asynchronous manner. Actual transmission of messages might occur over a stream-oriented channel or a message-oriented channel (such as SMS, etc).

As such, a communication link will be established between the carlet application 502 via the connection objects 514a and 518a of the data multiplexer and flow controller 518c. In one embodiment, the connection object 518a of the data multiplexer and flow controller 518c has the ability to switch between channels 525 that are available to the communications framework 516a of the client side. For instance, the data multiplexer and flow controller connection object 518a may initially establish a connection 524 to a channel 1 (CH 1). Connection 524 will thus communicate with a complementary channel 1 (CH 1) of the server side. The policy manager 520, is preferably a pluggable policy that can be custom tailored for the particular application or based on user specifications. For instance, the policy manager may contain code that will enable selection of different channels depending upon availability, the type of communication desired, bandwidth requirements for a given data transfer or transfers, payment of a bandwidth fee, subscription level, etc.

Assume in one example that the connection objects 514a and 518a have been established and are enabling data flow over connection 524 through channel 1. At some point in time, possibly when the client (e.g., a vehicle with a telematics control unit) enters a zone of higher bandwidth (e.g., such as a gas station with high wireless bandwidth services), channel 2 (CH 2) will become available. Its availability is detected by the channel monitor 522 of the communications framework 516a. If channel 2 is more desirable than channel 1, based on the policy set by the policy manager 520, the connection object 518a will initiate a switch to channel 2.

The switch to channel 2 will then be synchronized using the synchronization control 527, such that data being transferred between the client side and the server side achieve synchronization (i.e., thus preventing data loss during the switch). For instance, the data flow over connection 524 may be stopped causing a backup at the carlet application side. Any data still in the process of being transferred over channel 1 would be allowed to complete before allowing the connection object 518a to switch to channel 2, This synchronization between the client side and server side will enable channel switching, while preventing loss of data. Accordingly, once the connection object 518a has established synchronization between the client side and the server side, and the connection object 518a has switched from channel 1 to channel 2, the data flow is allowed to continue over connection objects 514a and 518a through channel 2, If any data was backed up at the client side, that data is then allowed to flow through channel 2.

This process would then continue depending upon the policy set by the policy manager, and based upon the continual monitoring of each of the available channels by the channel monitor 522. For instance, a carlet may have more than one connection open as illustrated by connection object 514b, and connection object 518b of data multiplexer and flow controller 518c.

In one embodiment, the term "switching" from one available physical channel to another shall include determining the availability of a physical connection (e.g. is a cell phone signal being detected") and the actual establishment of a connection (i.e., "a call was dialed and established a cell phone connection"). Accordingly, the system can more than just passively monitor for availability, but it can also (at the behest of its policy plug-in) dynamically establish and break down physical connections (in a manner informed both by availability and demand). This policy-driven call-control is a specific embodiment of the present invention, and has relation to mobile station connection technology.

In certain circumstances, a connection object 518b may lose a connection 526 due to a break in the transmission capability of a particular channel (e.g., by going out of range of a current wireless network). If this were to occur, the detection of the unavailability of channel 4 (CH 4), would be identified by the channel monitor 522. The connection object 518b would then determine whether the channel that became unavailable was actually in use. In one example, the channel may not actually be in use, but its loss in availability would still be detected, thus preventing its selection. In another example, it is assumed that channel 4 was in use. In such a case, data may have been lost due to the sudden drop in communication. When this occurs, the connection object 518b would communicate with a connection object 514b of the carlet to determine if data was in fact lost. If data was lost, a request would be made to the carlet for the lost data in case the carlet was sending data to the server, or a request would be made to the server for the lost data in case the server was sending data to the carlet.

The policy manager would then be queried to determine which one of the remaining channels being monitored by the channel monitor 522 would be most preferable to switch to, to continue the connection established between connection objects 514b and 518b. In this example, the connection object 518b would switch to connection 526' over channel 5 (CH 5), which may be a slower connection, although, the connection would be transparently re-established to enable continual data transmission. To complete the switch, the synchronization control 527 would work in conjunction with the client side and the server side to ensure that data being communicated between each of the data multiplexer and flow controllers 518c and 518s is synchronized, and any dropped data is retransmitted. Because the channel monitor 522 continues to monitor each of the channels, if the more preferred channel were to come back on, a transparent switch would again occur, as discussed with reference to the channel switch between connections 524 and 524'. Although the message manager is shown utilizing the stream manager, other implementations may have a message manager utilizing its own protocol, and in some cases, its own hardware.

Figure 7:
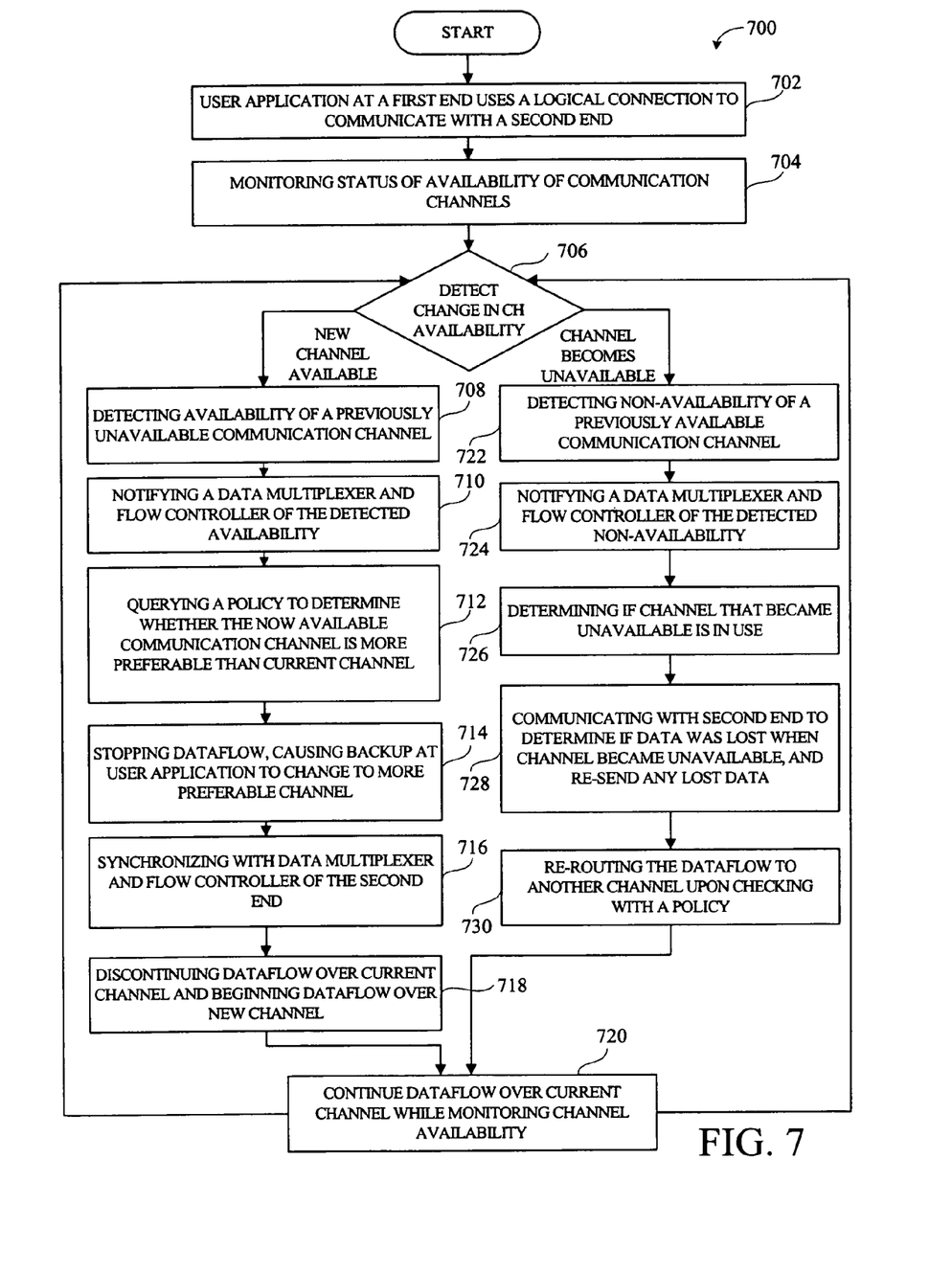
FIG. 7 is a flow chart diagram illustrating logic used to determine when a switch in communication channels is to occur in view of changing conditions to the available channels, in accordance with one embodiment of the present invention.

FIG. 7 shows a flow chart diagram 700 of the processes performed between a client side and a server side, implementing the dynamic ability to switch between available channels to achieve the desired quality of service dictated by a policy manager. The method begins at an operation 702 where a user application at a first end (e.g., client side), uses a logical connection to communicate with a second end (e.g., server side). While communication is established between the client side and the server side over a particular channel, the status of availability of communications channels are continually being monitored as described above.

In operation 706, a change in channel availability is detected. If the change is that a new channel becomes available, the method proceeds to operation 708. In operation 708, the availability of a previously unavailable communication channel is detected. As described above, the new channel may be a higher or lower bandwidth channel. For instance, in a wireless network, the carlet may be operating on an automobile telematics control unit (TCU), e.g., computer hardware having networking logic and telematics software. In general, the TCU includes hardware (e.g., an embedded PC board supporting integrated circuit chips), a real-time operating system, a Java virtual machine (JVM), an OSGi servicespace (Open Services Gateway Initiative), the telematics client framework that includes the client communications framework, and client applications (e.g., carlets).

As the automobile moves through the city, the connection may be a simple cell modem connection which allows for limited bandwidth for communication. However, if the automobile moves through a location of higher bandwidth availability (e.g., such as driving through a gas station (e.g., an eGasStation, an eParkingLot, an eGarage, eCityZone, eBusinessDistrictZone, or the like) or site that provides higher wireless bandwidth, the communications framework of the client side will detect the new availability of a new channel which will provides this higher bandwidth than that currently provided using a standard cell modem connection. As mentioned above, such higher bandwidth connection may be, for example, the wireless network standard 802.11b described above. It is important to note that reference to a 802.11b connection, a cell modem connection, etc., are only examples, as any wireless connection now available or that may become available in the future will work in the same manner, since the communications framework is independent of the actual network protocol implemented or underlying hardware.

Returning to FIG. 7, the method moves to operation 710 where a data multiplexer and flow controller (i.e., data pump) is notified of the detected availability. As noted above, the channel monitor will provide that information to the data multiplexer and flow controller of the client side. A policy is then queried to determine whether the now available communication is more preferable than the current channel. If that new current channel that became available is more preferable, the method will move to operation 714 where the current data flow would be stopped causing a backup at the user application in order to change to the more preferable channel. Synchronization would then be required in operation 716 between the data multiplexers and flow controllers (client and sever sides) such that data does not get lost between the client side and server side during the switch between channels.

The method would then move to operation 718 where the data flow over the current channel would be discontinued and the data flow would continue over the new channel that was established, provided that the synchronization was established between the data multiplexer and flow controllers of each end. The method would then proceed to operation 720 where data flow over the current channel would continue while monitoring the channel availability as mentioned above.

Moving back to operation 706, if the change in channel availability was a change noting that a current channel became unavailable, the method would move to operation 722. In operation 722, the non-availability of a previously available communication channel would be detected. This detected non-availability would be notified to the data multiplexer and flow controller such that the data multiplexer and flow controller could discontinue the transfer if the channel was currently in use. Accordingly, in operation 726, a determination is made as to whether the channel that became unavailable was in use. If the channel was not in use, then the data multiplexer and flow controller would not be required to resend any data, as no data was being transmitted over the particular channel that became unavailable. The method would then move to operation 728 where communication would be established with the second end to determine if data was lost when the channel became unavailable and any lost data would be resent in the case where the channel was actually being used to send data.

As mentioned above, in operation 730, rerouting of the data flow would be performed to another channel upon checking the policy manager to ensure that the proper channel would be selected. If the requested quality of service, e.g. bandwidth, were not available with the remaining channels, the user may be notified that a connection could not be re-established. Assuming that the connection could be re-established, the method would then continue to operation 720 where the data flow would be continued over the current channel, (e.g., the channel that was now selected due to the failure of a previously used channel). The process would continue monitoring the channels to determine whether new channels became available or whether current channels became unavailable and providing for intelligent switching between channels using the data multiplexer flow controller 518c of FIG. 6, in accordance with the pluggable policies provided through the policy manager 520.

Figure 8:
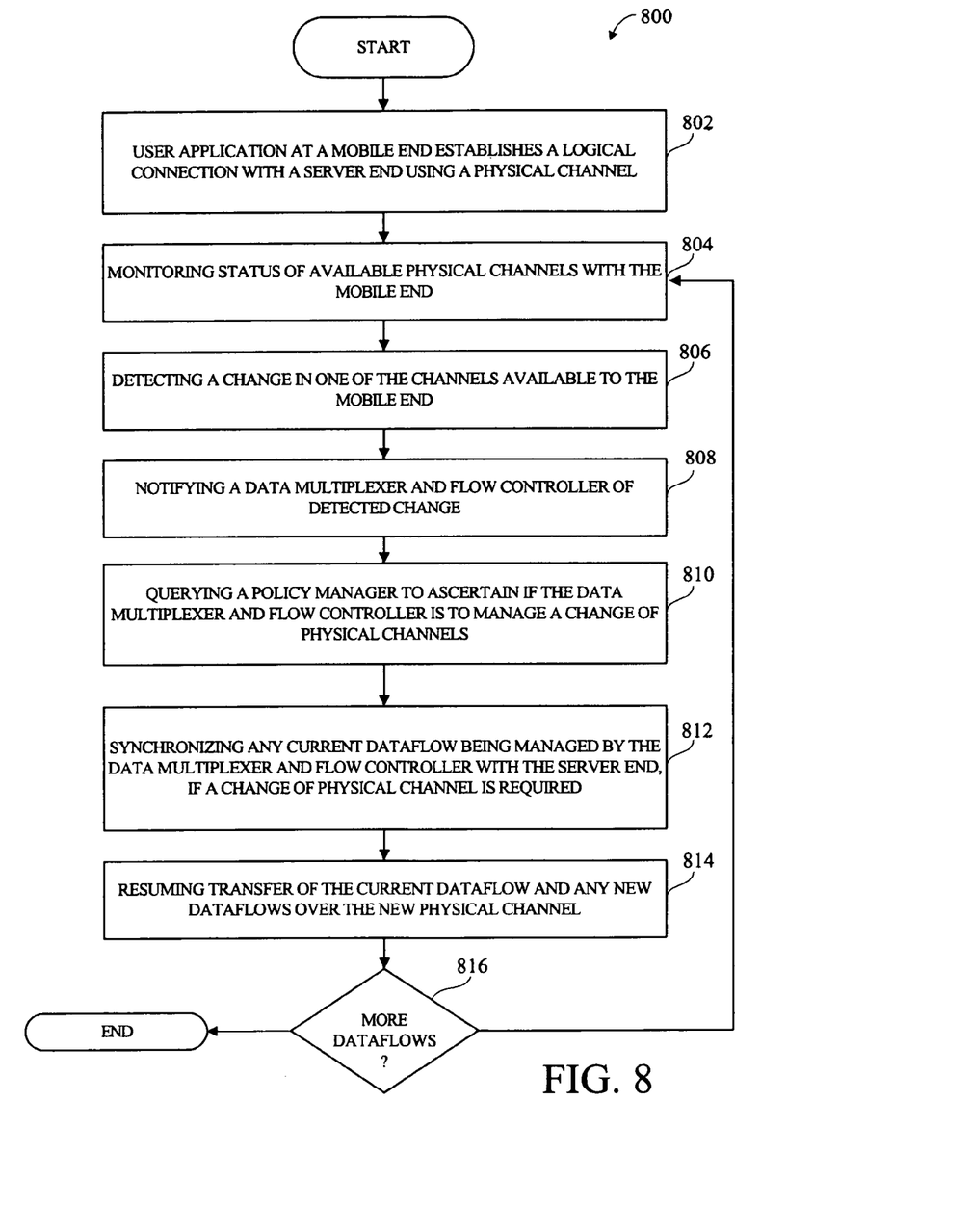
FIG. 8 is a flow chart diagram illustrating operations implement to determine when changes in channels is to occur in view of pre-set pluggable policies, in accordance with one embodiment of the present invention.

FIG. 8 illustrates a high level flow chart diagram of the method operations performed in accordance with the present invention. The method begins at operation 802 where a user application at a mobile end establishes a logical connection with a server end using a physical channel. The method then moves to operation 804 where the status of available physical channels with the mobile end is monitored. In operation 806, a change is detected in one of the channels available to the mobile end. The method would then move to operation 808 where a data multiplexer and flow controller would be notified of the detected change in available channels.

Now in operation 810, a policy manager would be queried to ascertain if the data multiplexer and flow controller is to manage a change of physical channels. If a change is desired or required, based upon a policy, synchronization is performed between the mobile end and the server end such that data is prevented from being lost during the switch. When the synchronizer ensures that the switch has properly occurred and the data multiplexer and flow controller completes the switch from one channel to another, the method would resume in operation 814 where the transfer of the current data flow and any new data flows over the new physical channel would continue.

In operation 816, it is determined if there are more data flows. If there are no more data flows to be communicated over client/server connection, the process would end. If there are more data flows, or new data flows are established, the method would continue where the status of available physical channels would be continued to be monitored at the mobile end to determine whether any other channel would be more appropriate for communication depending upon the pluggable policy set by the user.

In another embodiment, if no data flows are in progress, the channel monitor would continue to monitor available channels. In this manner, an available channel can be quickly selected depending on the carlet, and the properties passed from the carlet to the communications framework.

As used herein a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.). A carlet can be written to control or monitor applications to be processed by the telematics control unit (TCU) and interacted with using the on-board automobile monitor. As such, specialized carlets can be written to control the audio system, entertainment modules, such as on line games or movies, voice recognition, telecommunications, email communications (text and voice driven), etc. Accordingly, the type of carlets that can be written is unlimited. Carlets may be pre-installed or downloaded from a server. A carlet may or may not have an API which may be invoked by other carlets. The carlet may or may not have running threads of its own.

In practice, system carlets most likely will be written by the automobile manufacturer, who will be most knowledgeable of critical vehicle component operation, while nonvehicle system carlets can be written by independent software companies. Each carlet may therefore, in one embodiment, be associated with a set of properties. These properties, among other things, will dictate what minimum level of bandwidth should be provided by the communications framework.

As an overview, the Java virtual machine (JVM) is used as an interpreter to provide portability to Java applications. In general, developers design Java applications as hardware independent software modules, which are executed by Java virtual machines. The Java virtual machine layer is developed to operate in conjunction with the native operating system of the particular hardware on which the communications framework 516c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. The embodiments of the present invention are not limited to vehicle telematics applications, but to the contrary are applicable to all types of "mobile stations" (e.g., vehicles, cell phones, PDAs, laptops, mobile computing devices, etc.), which can intelligently and opportunistically exploit multiple asymmetric communications channels. Accordingly, the present embodiments are to be considered as illustrative and not restrictive, and the invention is not to be limited to the details given herein, but may be modified within the scope and equivalents of the appended claims.

What is claimed is:

1. A computer implemented system for routing between communication channels used to communicate between a client application and a server application integrated in a telematics technology framework, comprising:
    a communications framework, the communications framework including,
        a data pump for managing connections between the client application and the server application, the data pump implements dedicated connection objects for handling each connection between the client application and the server application;
        a policy manager for setting a pluggable policy of quality of service properties for connections between the client application and the server application to enable each connection of the dedicated connection objects to switch between channels depending upon the pluggable policy set by a user; and
        a channel monitor for monitoring availability of each channel capable of interfacing with the communications framework;
    whereby a connection object of the dedicated connection objects, triggered to switch from a current channel to another channel based on channel availability information obtained from the channel monitor and the pluggable policy of the policy manager, interfaces with a synchronization control to avoid data loss between the client application and the server application and to enable communication between the client side and the server side.

2. The computer implemented system of claim 1, wherein the synchronization control is in communication with the data pump of the client application and a data pump of the server application.

3. The computer implemented system of claim 1, further comprising:
    a stream manager, the stream manager being configured to initiate communication between the client application and the communications framework.

4. The computer implemented system of claim 3, further comprising:
    a message manager, the message manager being configured to handle message communication between the client application and the communications framework.

5. The computer implemented system of claim 1, wherein the client application is a carlet and the client application is executed on a telematics control unit (TCU) of a vehicle, the carlet configured to render control and interfacing with a component of the vehicle.

6. The computer implemented system of claim 1, wherein the system is integrated in a telematics technology client framework.

7. The computer implemented system of claim 1, wherein the server application is integrated in a telematics technology portal framework.

8. The computer implemented system of claim 1, wherein the data pump defines a data multiplexer and flow controller.

9. A computer implemented telematics system, the system comprising:
    a telematics client framework, the telematics client framework including an interface to client applications and being integrated with a client communications framework, the client communications framework including,
        a client stream manager,
        a client data pump,
        a client policy manager for setting a pluggable policy of quality of service properties for connections between a client application and a server application to enable each connection of the dedicated connection objects to switch between channels depending upon the pluggable policy set by a user; and
        a client channel monitor for detecting availability of channels for communication with a telematics server framework, the telematics server framework including an interface to server applications and being integrated with a server communications framework, the client channel monitor being configured to communicate availability of channels to connection objects of the client data pump, and the client channel monitor enabling a connection object between the client application and a server application to be triggered to switch between channels based on information obtained from the client policy manager.

10. The computer implemented telematics system of claim 9, wherein the telematics client framework is running on a telematics control unit (TCU) of a vehicle.

11. The computer implemented telematics system of claim 9, wherein the telematics control unit (TCU) includes hardware, a real-time operating system, a JVM, an OSGi servicespace, the telematics client framework that includes the client communications framework, and client applications.

12. The computer implemented telematics system of claim 9, wherein the client applications are carlets.

13. The computer implemented telematics system of claim 9, wherein the client communications framework uses a wireless channel to connect to the server communications framework.

14. The computer implemented telematics system of claim 9, wherein the telematics system implements a synchronization control to manage communication changes between channels.

15. A method for adaptively routing between multiple communication channels used to communicate between a client application and a server application of a telematics system, comprising:
receiving a request for a communications connection from the client application to the server application;
establishing a connection object to define a wireless connection between the client application and the server application using one channel selected from two or more available channels;
monitoring the two or more available channels;
detecting a change in availability of the two or more available channels;
referring to a pluggable policy of quality of service properties for connections between the client application and the server application to enable each connection, which is set by a user, to determine if a change in the selected channel of the connection object is required after detecting the change in availability, and if a change is required,
synchronizing data transferred between the client side and the server side to avoid data loss between the client application and the server application; and
switching from the selected channel to another of the two or more available channels within the connection object.

16. The method of claim 15, wherein a change in availability of the two or more available channels is detected when one of a new channel becomes available and an existing channel becomes unavailable.

17. The method of claim 15, wherein the two or more available channels provide connections of the same or different bandwidth.

18. The method of claim 15, wherein the method is executed using a java virtual machine.

19. The method of claim 15, wherein the pluggable policy defines logic for when switching is desirable in view of current available channels.

* * * * *